United States Patent
Banavalikar et al.

(10) Patent No.: US 9,628,290 B2
(45) Date of Patent: Apr. 18, 2017

(54) TRAFFIC MIGRATION ACCELERATION FOR OVERLAY VIRTUAL ENVIRONMENTS

(71) Applicant: INTERNATIONAL BUSINESS MACHINES CORPORATION, Armonk, NY (US)

(72) Inventors: Bhalachandra G. Banavalikar, Cupertino, CA (US); Stephan Benny, San Jose, CA (US); Amitabha Biswas, San Francisco, CA (US); Uday S. Nagaraj, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 14/050,091

(22) Filed: Oct. 9, 2013

(65) Prior Publication Data
US 2015/0100958 A1    Apr. 9, 2015

(51) Int. Cl.
| | |
|---|---|
| *G06F 15/173* | (2006.01) |
| *H04L 12/46* | (2006.01) |
| *G06F 9/50* | (2006.01) |
| *G06F 9/48* | (2006.01) |
| *G06F 9/455* | (2006.01) |

(52) U.S. Cl.
CPC ...... *H04L 12/4633* (2013.01); *G06F 9/45533* (2013.01); *G06F 9/45558* (2013.01); *G06F 9/4856* (2013.01); *G06F 9/505* (2013.01); *G06F 9/5083* (2013.01); *G06F 9/5088* (2013.01); *G06F 2009/4557* (2013.01)

(58) Field of Classification Search
CPC ......... G06F 2209/4557; G06F 9/45558; G06F 9/45533; G06F 9/4856; G06F 9/505; G06F 9/5083; G06F 9/5088
See application file for complete search history.

(56) References Cited

U.S. PATENT DOCUMENTS

| | | |
|---|---|---|
| 2009/0204718 A1 | 8/2009 | Lawton et al. |
| 2012/0209940 A1 | 8/2012 | Kidambi et al. |
| 2012/0278804 A1 | 11/2012 | Narayanasamy et al. |
| 2012/0297384 A1 | 11/2012 | Barabash et al. |

(Continued)

FOREIGN PATENT DOCUMENTS

EP    2309387 A1    4/2011

OTHER PUBLICATIONS

Hacking, S. et al., "Improving the Live Migration Process of Large Enterprise Applications", VTDC '09, Jun. 2009, pp. 51-58, ACM, USA.

(Continued)

*Primary Examiner* — Nam Tran
(74) *Attorney, Agent, or Firm* — Sherman IP LLP; Kenneth L. Sherman; Steven Laut

(57) ABSTRACT

Embodiments of the invention relate to providing acceleration for traffic migration for virtual machine (VM) migration in overlay networks. One embodiment includes a method that includes migrating of a VM from a first hypervisor to a second hypervisor. The first hypervisor detects incoming encapsulated traffic sent from a third hypervisor that is targeted for the VM. The first hypervisor indicates to a service of incorrect information in the incoming encapsulated traffic for the VM. The third hypervisor is notified with updated information for the VM.

17 Claims, 10 Drawing Sheets

(56) References Cited

U.S. PATENT DOCUMENTS

2012/0311568 A1* 12/2012 Jansen ................ G06F 9/45558
 718/1
2012/0324443 A1   12/2012 Low et al.
2013/0064133 A1*  3/2013 Ritz ...................... G06F 9/4555
 370/254
2013/0074065 A1   3/2013 McNeeney et al.
2013/0227559 A1*  8/2013 Tsirkin ................ G06F 9/45558
 718/1

OTHER PUBLICATIONS

Mell, P. et al., "The NIST Definition of Cloud Computing", Special Publication, Version 15, Oct. 7, 2009, 2 pages, National Institute of Standards and Technology, Information Technology Laboratory, USA.

* cited by examiner

TRAFFIC MIGRATION ACCELERATION FOR OVERLAY VIRTUAL ENVIRONMENTS

BACKGROUND

Embodiments of the invention relate to overlay virtual environments and, in particular, providing acceleration for traffic migration for virtual machine (VM) migration in overlay networks.

Network virtualization that use overlays allow for virtual machine (VM) migration from one hypervisor to another. The hypervisors may be located on different Internet protocol (IP) subnets. Switches on the hypervisors encapsulate traffic for a destination VM's associated hypervisor before delivering the traffic to an IP cloud, and on the way to the destination hypervisor. When a VM migrates from one hypervisor to another, the traffic destined for the migrated VM's previous hypervisor becomes lost.

BRIEF SUMMARY

Embodiments of the invention relate to providing acceleration for traffic migration for virtual machine (VM) migration in overlay networks. One embodiment includes a method that includes migrating of a VM from a first hypervisor to a second hypervisor. In one embodiment, the first hypervisor detects incoming encapsulated traffic sent from a third hypervisor that is targeted for the VM. The first hypervisor indicates to a service of incorrect information in the incoming encapsulated traffic for the VM. In one embodiment, the third hypervisor is notified with updated information for the VM.

Another embodiment comprises a system that includes a hardware layer comprising physical devices. In one embodiment, the system includes a plurality of virtual switches each associated with a hypervisor and one or more VMs overlaying the hardware layer. In one embodiment, a server includes a distributed overlay virtual Ethernet (DOVE) connectivity service (DCS) that tracks VM information. In one embodiment, a first hypervisor detects incoming encapsulated traffic including information for a targeted VM that migrated from the first hypervisor to a second hypervisor, and indicates to the DCS that the information is incorrect, and the DCS notifies a third hypervisor with updated information for the VM that migrated.

Another embodiment comprises a computer program product for providing acceleration for traffic migration of virtual machine (VM) migration in overlay networks. The computer program product comprises a computer-readable storage medium having program code embodied therewith, the program code readable/executable by a processor to perform a method comprising: migrating, by the processor, a virtual machine (VM) from a first hypervisor to a second hypervisor. In one embodiment, the method includes detecting, by the first hypervisor, incoming encapsulated traffic sent from a third hypervisor that is targeted for the migrated VM. In one embodiment, the method further includes indicating to a service, by the first hypervisor, information that is incorrect in the incoming encapsulated traffic for the VM. In one embodiment, the method includes notifying the third hypervisor with updated information for the VM.

These and other features, aspects and advantages of the present invention will become understood with reference to the following description, appended claims, and accompanying figures.

DETAILED DESCRIPTION

Figure 1:
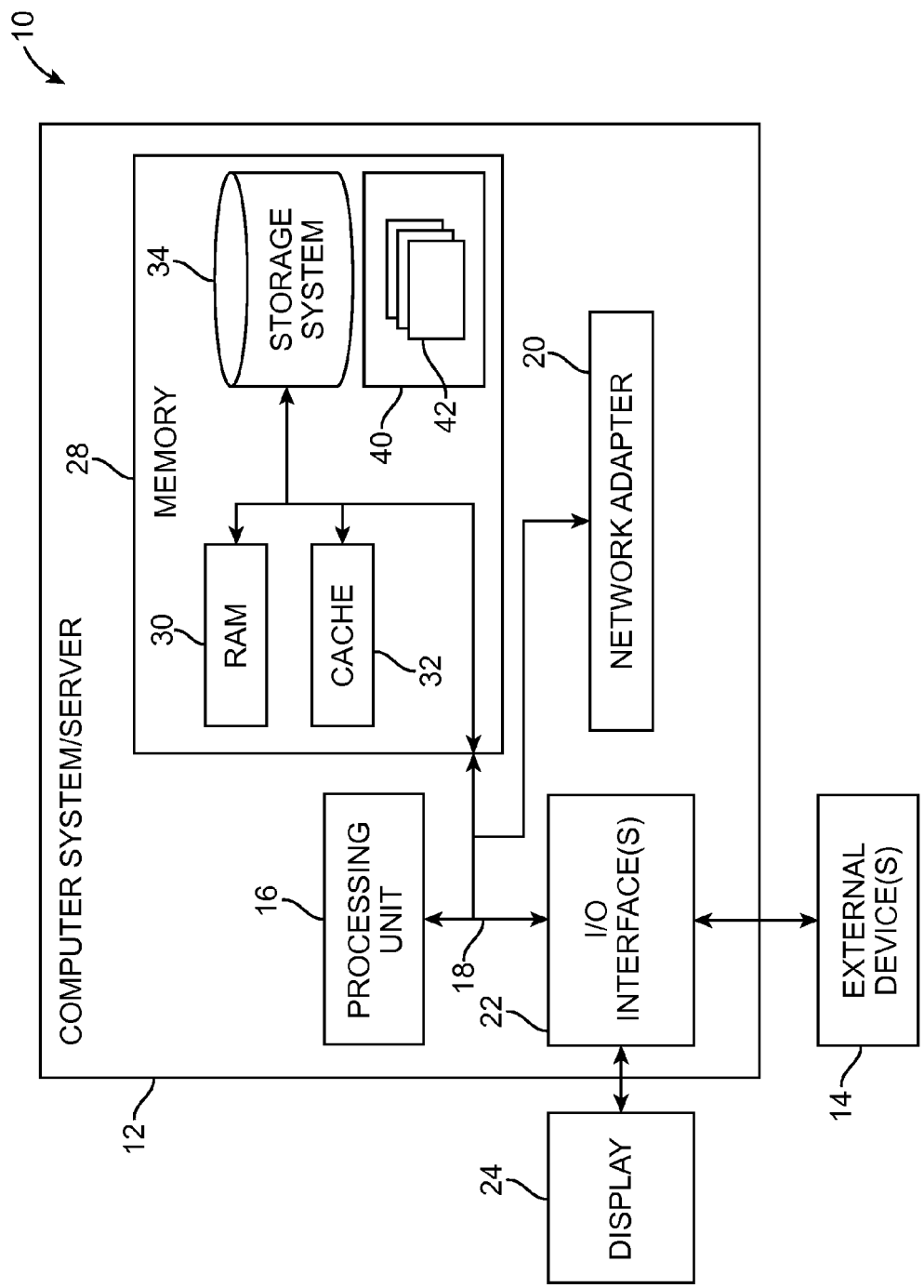
FIG. 1 depicts a cloud computing node, according to an embodiment of the invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thus providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable, and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wired, optical fiber cable, radio frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

The computer system/server 12 may also communicate with one or more external devices 14, such as a keyboard, a pointing device, etc.; a display 24; one or more devices that enable a consumer to interact with the computer system/server 12; and/or any devices (e.g., network card, modem, etc.) that enable the computer system/server 12 to communicate with one or more other computing devices. Such communication can occur via I/O interfaces 22. Still yet, the computer system/server 12 can communicate with one or more networks such as a local area network (LAN), a general wide area network (WAN), and/or a public network (e.g., the Internet) via a network adapter 20. As depicted, the network adapter 20 communicates with the other components of the computer system/server 12 via a bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

Figure 2:
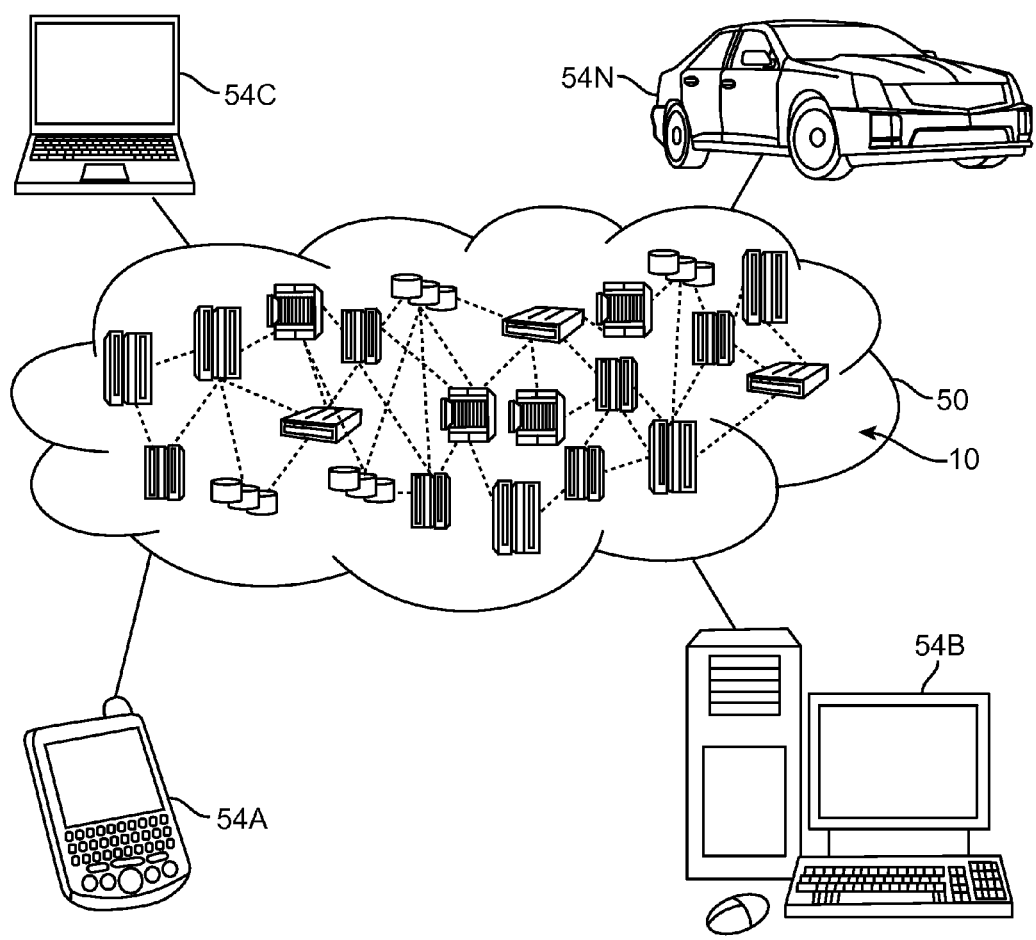
FIG. 2 depicts a cloud computing environment, according to an embodiment of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
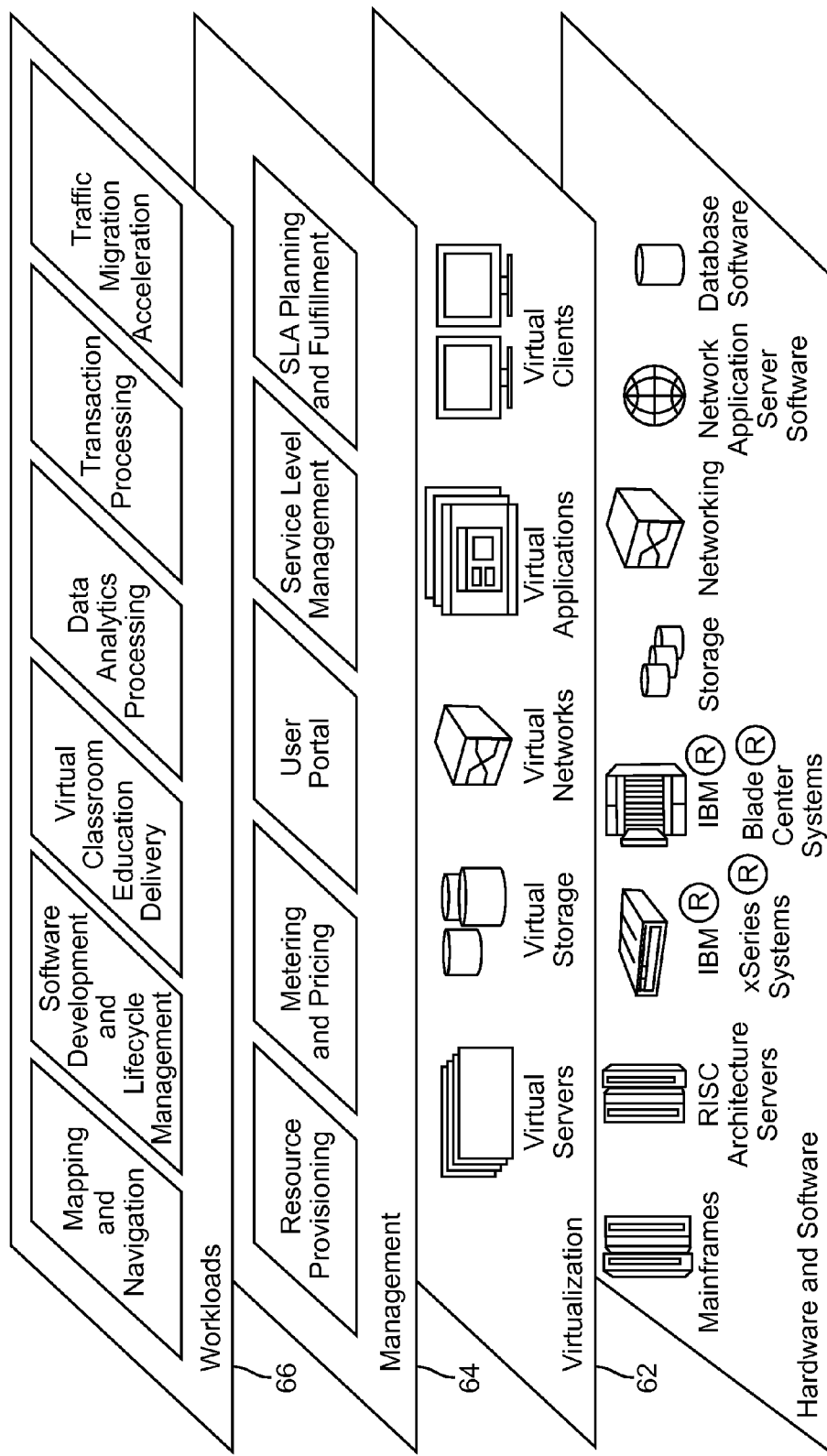
FIG. 3 depicts abstraction model layers, according to an embodiment of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include mainframes. In one example, hardware components comprise IBM® zSeries® systems and RISC (Reduced Instruction Set Computer) architecture-based servers. In one example, hardware components comprise IBM pSeries® systems, IBM xSeries® systems, IBM BladeCenter® systems, storage devices, networks, and networking components. Examples of software components include network application server software. In one example, software components comprise IBM WebSphere® application server software and database software. In one example, software components comprise IBM DB2® database software. (IBM, zSeries, pSeries, xSeries, BladeCenter, WebSphere, and DB2 are trademarks of International Business Machines Corporation registered in many jurisdictions worldwide.)

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment and provide billing or invoicing for consumption of these resources. In one example, these resources may comprise application software licenses. Security provides identity verification for cloud consumers and tasks as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and traffic migration acceleration. As mentioned above, all of the foregoing examples described with respect to FIG. 3 are illustrative only, and the invention is not limited to these examples.

It is understood all functions of the present invention as described herein are typically performed by the network independent network interface system 500 (FIG. 5), or overlay network system 900 (FIG. 9), which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Embodiments of the invention relate to providing acceleration for traffic migration for virtual machine (VM) migration in overlay networks. One embodiment includes a method that includes migrating of a VM from a first hypervisor to a second hypervisor. In one embodiment, the first hypervisor detects incoming encapsulated traffic sent from a third hypervisor that is targeted for the VM. The first hypervisor indicates to a service of incorrect information in the incoming encapsulated traffic for the VM. In one embodiment, the third hypervisor is notified with updated information for the VM.

Figure 4:
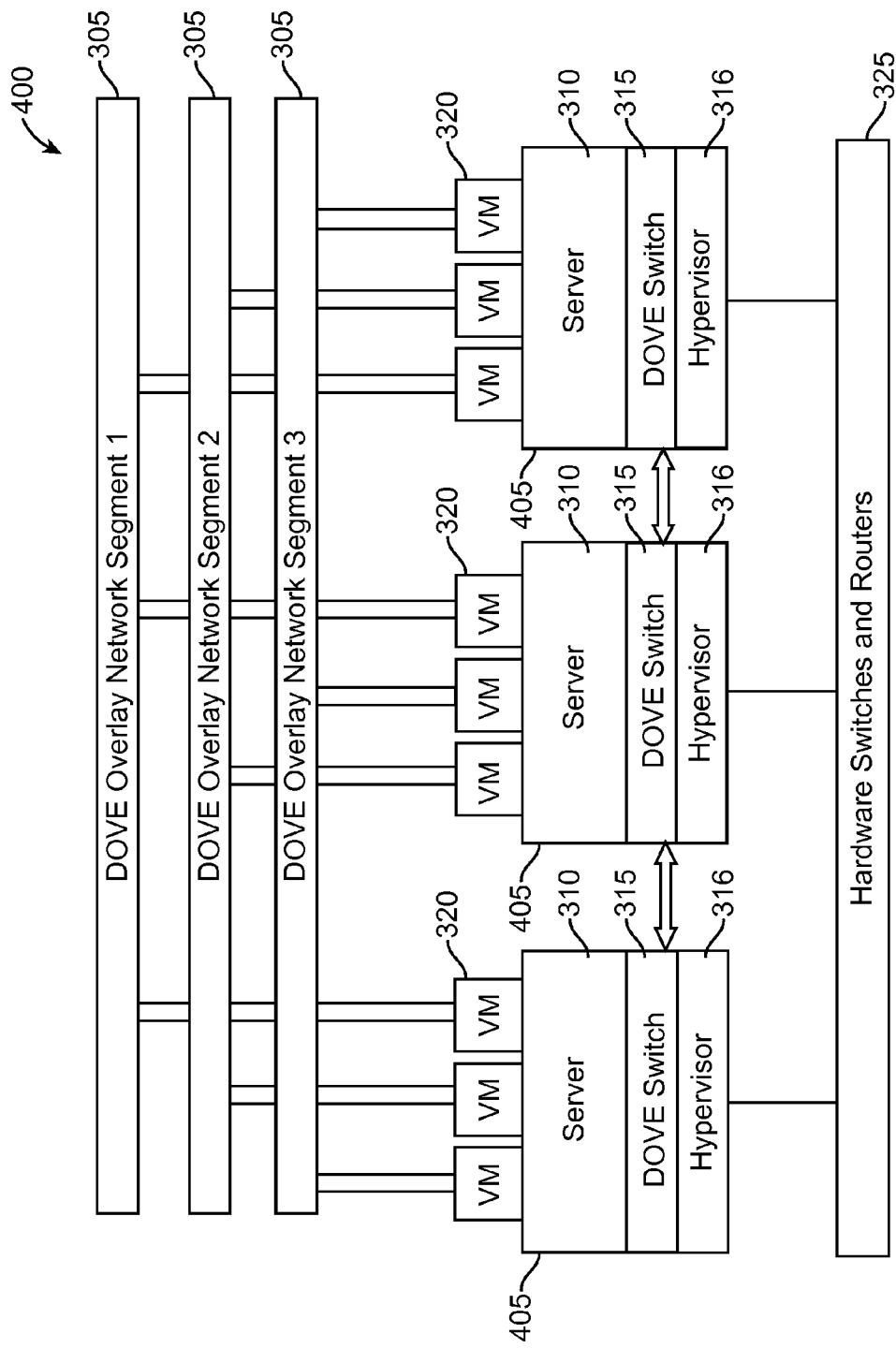
FIG. 4 is a block diagram illustrating a distributed overlay virtual environment for employing an embodiment of the invention.

FIG. 4 shows a block diagram illustrating a distributed overlay virtual environment 400 for employing an embodiment of the present invention. In one embodiment, the distributed overlay virtual environment 400 may comprise a distributed overlay virtual Ethernet (DOVE) network system. In one embodiment, the distributed overlay virtual environment 400 includes multiple virtual systems (or networks) 405 (also known as DOVE modules). In one embodiment each system 405 comprises a service appliance or server 310 (also may be referred to as a host), a virtual (DOVE) switch 315, and a hypervisor 316. In one embodiment, VMs 320 may be connected with each network 405. In one embodiment, the network 405 overlays a physical layer 325 (e.g., including physical hardware and software processes) that may include physical switches, routers, servers, gateways, firewalls, etc. The DOVE systems 405 architecture provide for abstracting the physical network infrastructure from hypervisor 316 hosts and allows making network changes in software rather than hardware. The systems 405 use the virtual switches 315 deployed on the hypervisors 316 to create tunnels between endpoints across the underlying network infrastructure.

The physical layer 325 may also be referred to as the underlay. In one embodiment, overlay network segments 1-N 305 (e.g., overlay network segments 1-3) connect the multiple systems for communication of the different elements (e.g., hypervisors 316, VMs 320), where N is a positive number (e.g., 2, 3, 5, 10, etc.). It should be noted that while three systems 405 are shown, more (or less) systems 405 may be included in the distributed overlay virtual environment 400. In one embodiment, the virtual switches 315 comprise DOVE switches.

In one embodiment, the overlay network segments 1-N 305 create overlay networks between the hypervisors 316 and use encapsulation of packets, where packets originating from one VM 320 are encapsulated (e.g., adding overlay and physical network headers) and the physical layer 325 (underlay) is used to deliver to a server 310 where the target VM 320 resides. In one embodiment, in the physical layer 325, an outer header is used by physical switches to forward packets, where an overlay identification (ID) in an encapsulation header provides traffic isolation. Incoming packets to a virtual switch 315 of a destination server 310 are decapsulated (e.g., the encapsulation headers are stripped from the packet) and delivered to a destination VM 320. In one embodiment, address independence between different systems 405 is supported. For example, two different VMs 320 operating in two different systems 405 may have the same Internet Protocol (IP) address and media access control (MAC) address. As another example, the systems 405 support deploying VMs 320, which belong to the same system 405, to different hosts that are located in different physical subnets (includes switches and/or routers between the physical entities). In another embodiment, VMs 320 belonging to different systems 405 may be hosted on the same physical host. In yet another embodiment, the systems 405 support VM 320 migration anywhere in a data center without changing the VM 320 network address and losing its network connection.

In one embodiment, the systems 405 encapsulate data with physical path translations based upon policies (e.g., from a DCS, e.g., DCS 510, FIG. 5), and send the encapsulated data between systems 405 that, in turn, is decapsulated and forwarded to a destination VM 320. In one embodiment, the policies describe in a logical manner how data is required to be sent over virtual networks without details of the underlying physical entities that performs particular tasks.

In one embodiment, the hypervisors 316 (e.g., VM 320 managers) allow multiple operating systems (e.g., VMs, such as VMs 320) to run concurrently on a host computer. A hypervisor 316 provides abstraction of physical resources to the VMs 320. For example, a physical network interface card (NIC) may be abstracted as a virtual NIC (vNIC) of a system 405. In one embodiment, a virtual switch 315 is a software abstraction of an Ethernet switch in the hypervisor 316 for providing connectivity for VMs 320.

Figure 5:
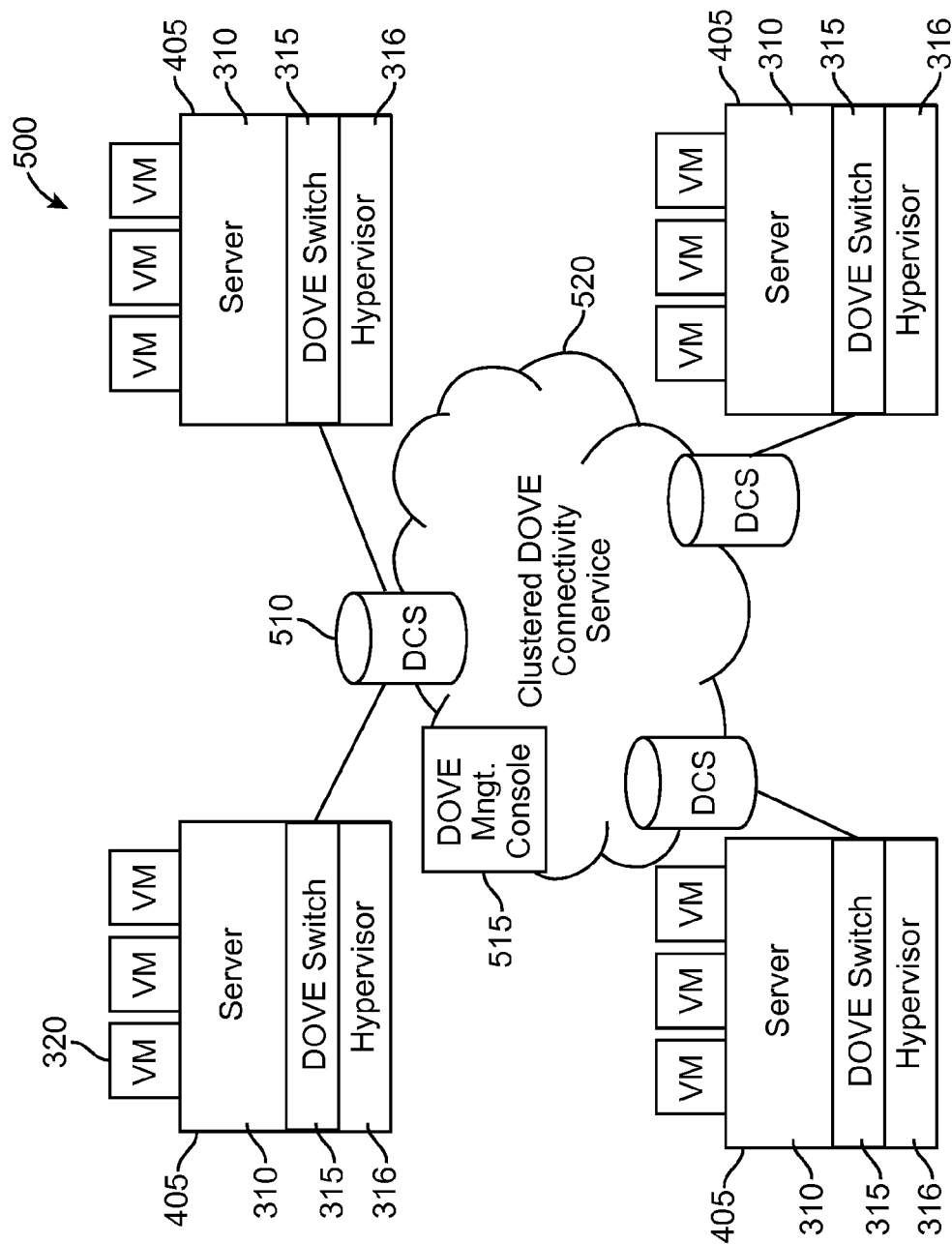
FIG. 5 illustrates another block diagram of a distributed overlay virtual environment, in accordance with an embodiment of the invention.

FIG. 5 illustrates a block diagram illustrating a distributed overlay virtual environment 500, in accordance with an embodiment of the invention. In one embodiment, the distributed overlay virtual environment 500 includes multiple systems 405, and a clustered DOVE connectivity service (DCS) 520. In one embodiment, the DCS 520 comprises multiple DCS nodes 510 and a DOVE management console 515 for managing the multiple DCS nodes 510 and providing the DCS node 510 an internet protocol (IP) address to a virtual switch 315. In one example embodiment, on a VM 320 activation, a virtual switch 315 detects the IP/MAC address of the VM 320 and updates address mapping in the DCS 520. In one embodiment, the DCS nodes 510 share the address mapping information in the clustered DCS 520. In one example embodiment, a first VM 320 begins communicating with a second VM 320 in another system 405. The virtual switch 315 associated with the first VM 320 requests resolution from a DCS 510 servicing the virtual switch 315. The DCS 510 responds with the second VM 320 mapping information, which is cached locally at the virtual switch 315. In one example embodiment, the mapping is tracked in a DCS node that may or may not be hosted by a server 310 (e.g., the DCS node may exist anywhere in the distributed overlay virtual environment 500) and comprises mapping addresses of VMs 320 and their associated virtual switches 315.

Figure 6:
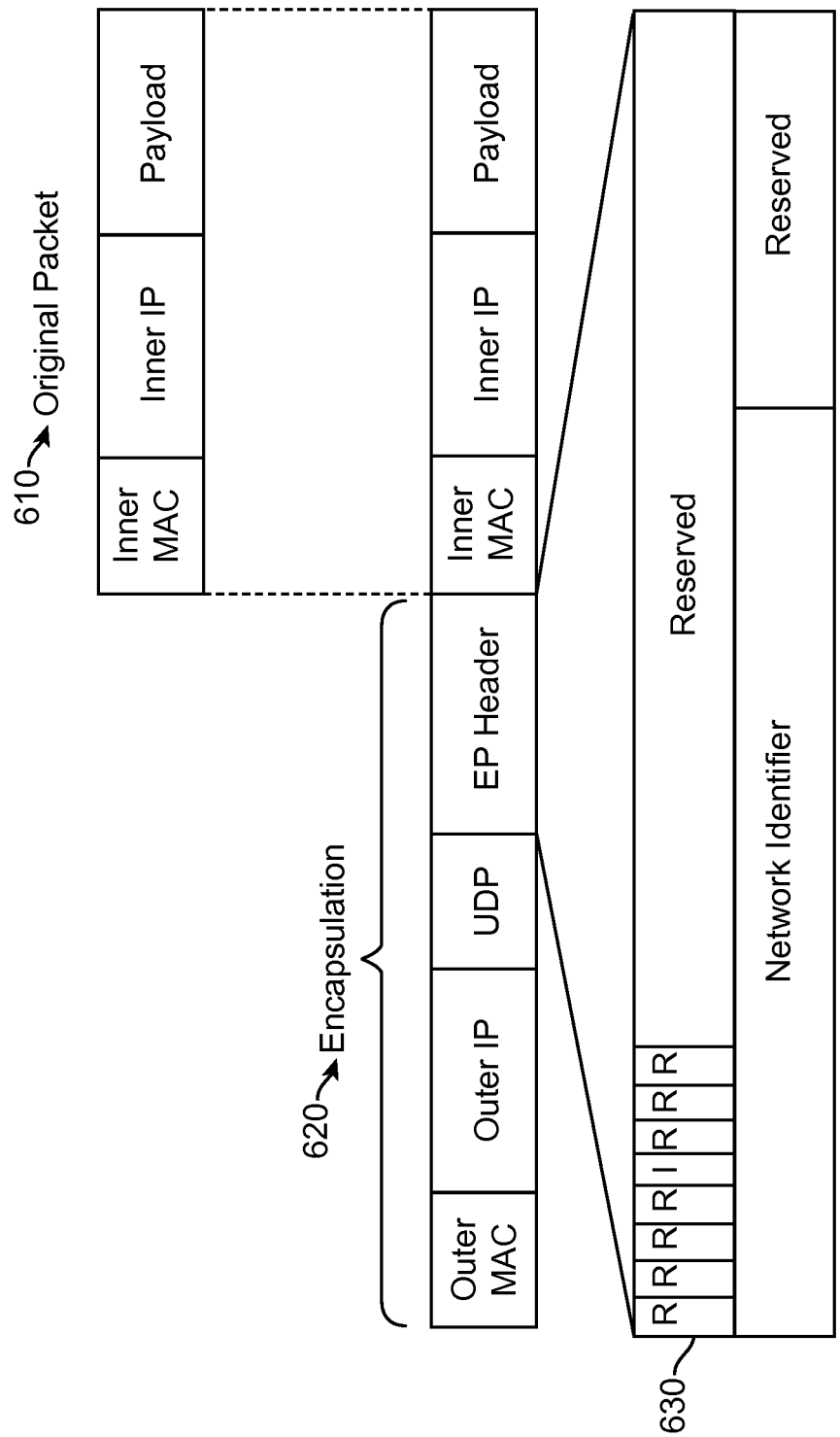
FIG. 6 illustrates an encapsulation format that may be used, in accordance with an embodiment of the invention.

FIG. 6 illustrates an example encapsulation format that may be used for traffic in an overlay system, in accordance with an embodiment of the invention. In one embodiment, an original packet 610 may comprise an inner MAC address, an inner IP address, and payload information. In one example, one VM 320 (FIGS. 4-5) desires to communicate the original packet 610 to another VM 320. In one embodiment, the original packet 610 is encapsulated by a virtual (DOVE) switch 315 of a system 405 (FIGS. 4-5) by adding encapsulation formatted fields 620, such as for an outer MAC address, outer IP address, user datagram protocol (UDP), the encapsulation protocol header, and an optional field (not shown). In one embodiment, the encapsulation protocol header comprises a format 630 of a specific encapsulation protocol type, such as VxLAN, NVGRE, etc. In one embodiment, each virtual switch 315 supports specific tunneling translation encapsulation protocol formats. If an encapsulated packet is sent to a VM 320 associated with a virtual switch 315 that doesn't support the encapsulation protocol type for the encapsulated packet, the packet must be formatted or translated (e.g., by a translation gateway) with an encapsulation protocol type that it can process.

In one embodiment, the virtual switch 315 interoperate with a DCS node 510 and exchanges information with the DCS node 510 using type-length value (TLV)/UDP or transmission control protocol (TCP) based protocols. The DCS node 510 replicates information for forwarding requests and communicating a DCS node IP address to the virtual switch 315.

Figure 7:
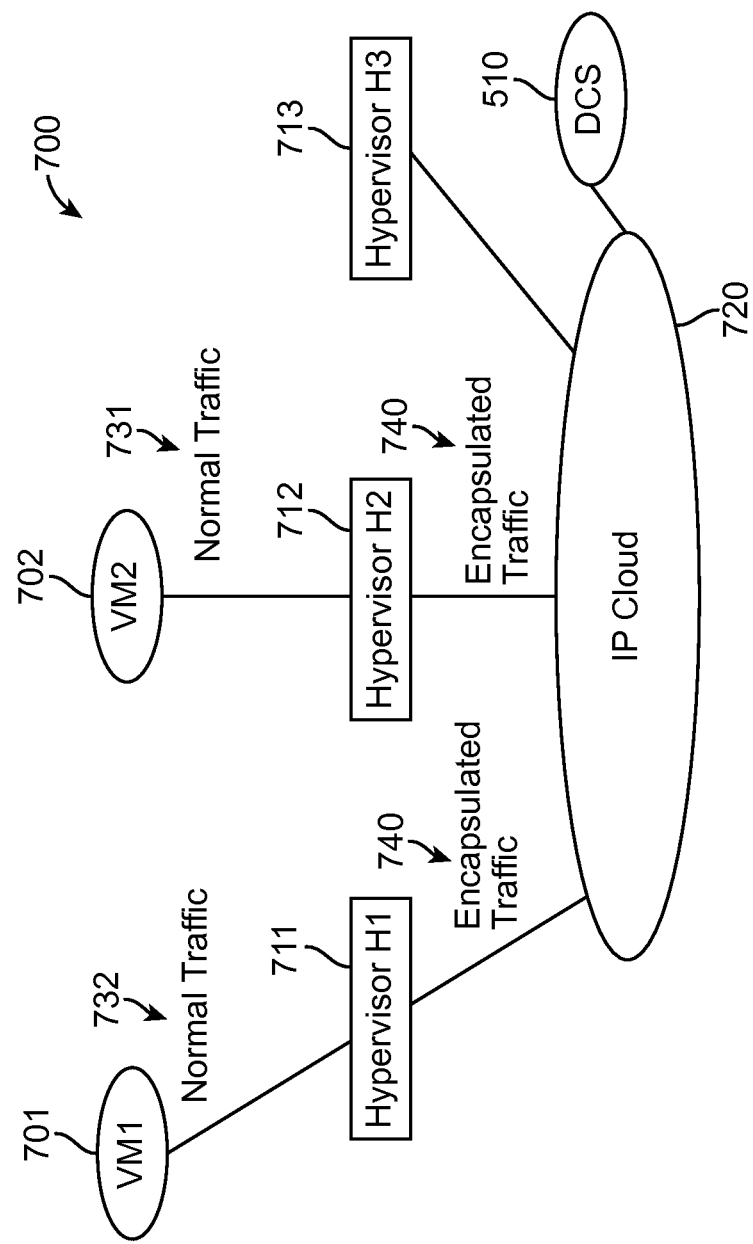
FIG. 7 is a block diagram showing an example overlay virtual network environment, in accordance with an embodiment of the invention.

FIG. 7 is a block diagram showing an example overlay virtual network environment 700 that may employ an embodiment of the invention. In one example, the overlay virtual network environment 700 shows VM1 701 hosted on hypervisor H1 711, VM2 702 hosted on hypervisor H2 712, and hypervisor H3 713 that is shown without any hosted VMs. The IP cloud environment 720 is shown connected with a DCS node or DCS server 510. In one example embodiment, traffic to/from the VMs (VM1 701 and VM2 702) comprise normal or decapsulated traffic 731/732. In one example embodiment, traffic to/from the hypervisors H1 711 and H2 712 comprise encapsulated traffic 740. In one example, traffic is flowing between VM1 701 and VM 2 702. The Hypervisors H1 711 and H2 712 may be located on different IP subnets. Virtual switches (vSwitches) on the Hypervisors H1 711 and H2 712 encapsulate the traffic coming from VM1 701 and VM2 702 before delivering the traffic to the IP cloud 720, and on its way to the destination Hypervisor.

In the example overlay virtual network environment 700, the DCS server 510 provides the vSwitches with information regarding location of VMs, such as VM1 710 and VM2 702. The information regarding location may comprise an IP address, MAC address, or both. In one example, a service may be used by the hypervisors H1 711 and H2 712, and the service may include a service provided by the DCS server 510.

In traditional overlay systems, once the hypervisors H1 711 and H2 712 are aware of the location information of the destination VMs (e.g., VM1 701 and/or VM2 702), the hypervisors H1 711 and H2 712 will cache (i.e., store in cache memory) that location information and not contact the DCS server 510 any further.

Figure 8:
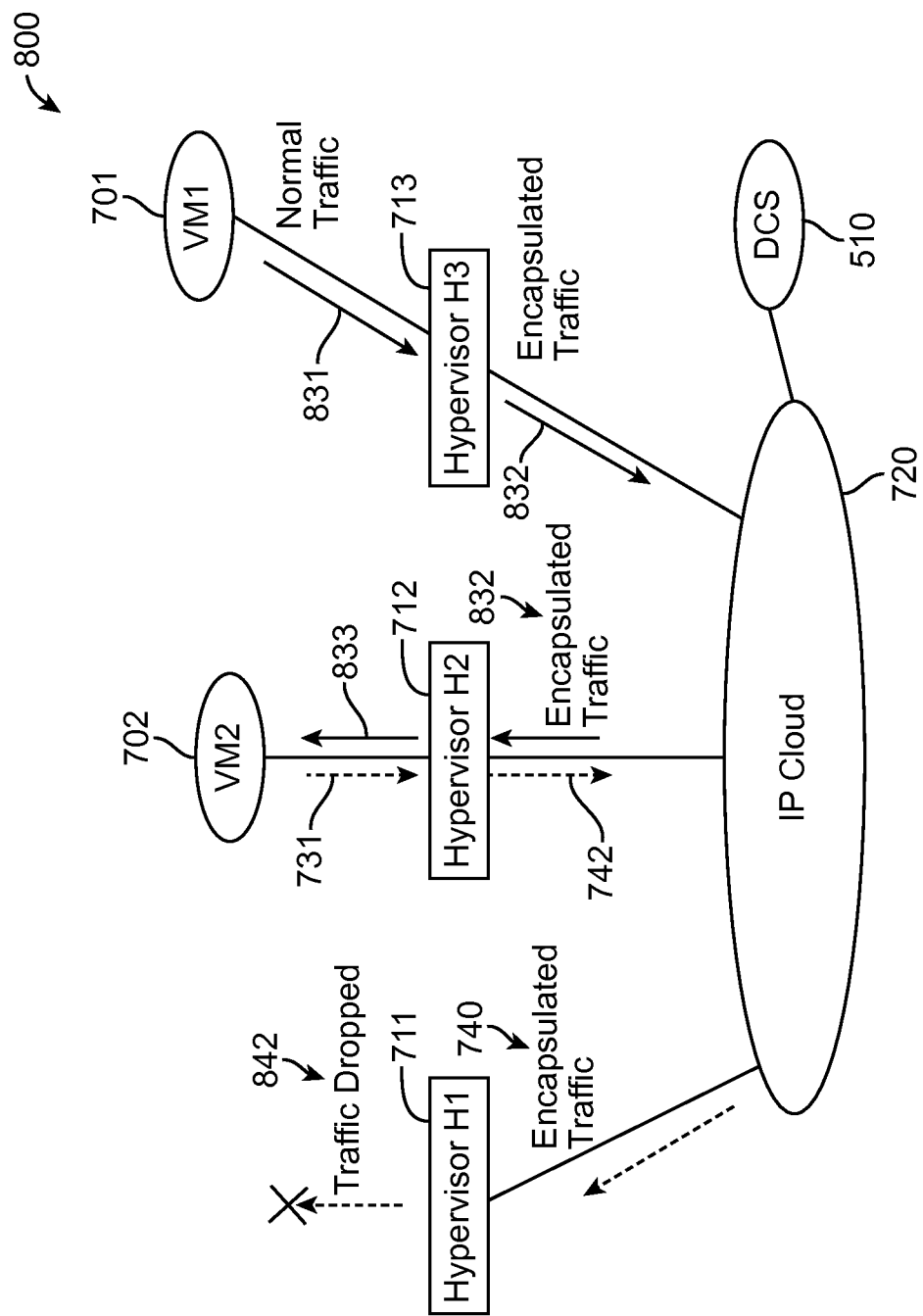
FIG. 8 is a block diagram showing an example overlay virtual network environment with migration of a VM showing traffic loss.

FIG. 8 is a block diagram showing an example overlay virtual network environment 800 with migration of VM1 701 showing traffic loss 842. In one example, VM1 701 has migrated from hypervisor H1 711 and is now hosted by hypervisor H3 713. If traffic (normal traffic 731, encapsulated traffic 742/740) was flowing from VM2 702 to VM1 701, and hypervisor H2 712 is not informed about the migration of VM1 701 moving from hypervisor H1 711 to hypervisor H3 713, then hypervisor H2 712 will continue to encapsulate traffic (traffic 742) from VM2 702 and send it to hypervisor H1 711 targeted for VM1 701. In the traditional overlay virtual network environment 800, hypervisor H1 is aware that it does not host VM1 710, and is not aware of VM1's 701 new location. The location information is only available on the DCS server 510.

In traditional overlay network implementations, the encapsulation technology used is based on UDP, and the packet is delivered, but with the incorrect address (i.e., a feedback loop does not exist to indicate correct traffic packet delivery. Therefore, in the example overlay virtual network environment 800, the traffic sent from VM2 702 to the VM1 701 may be permanently lost, unless the hypervisor H2 712 requests that the DCS server 510 send location information for VM1 701 again. In one example, the normal traffic 831 from VM1 701 to the hypervisor H3 713, which encapsulates the traffic 832 and send to the hypervisor H2 832 and is delivered to the VM2 702 as normal traffic 833, but the hypervisor H2 712 remains unaware of the location change for VM1 701 unless the hypervisor H2 712 requests that the DCS server 510 forward location information for VM1 701 again.

Figure 9:
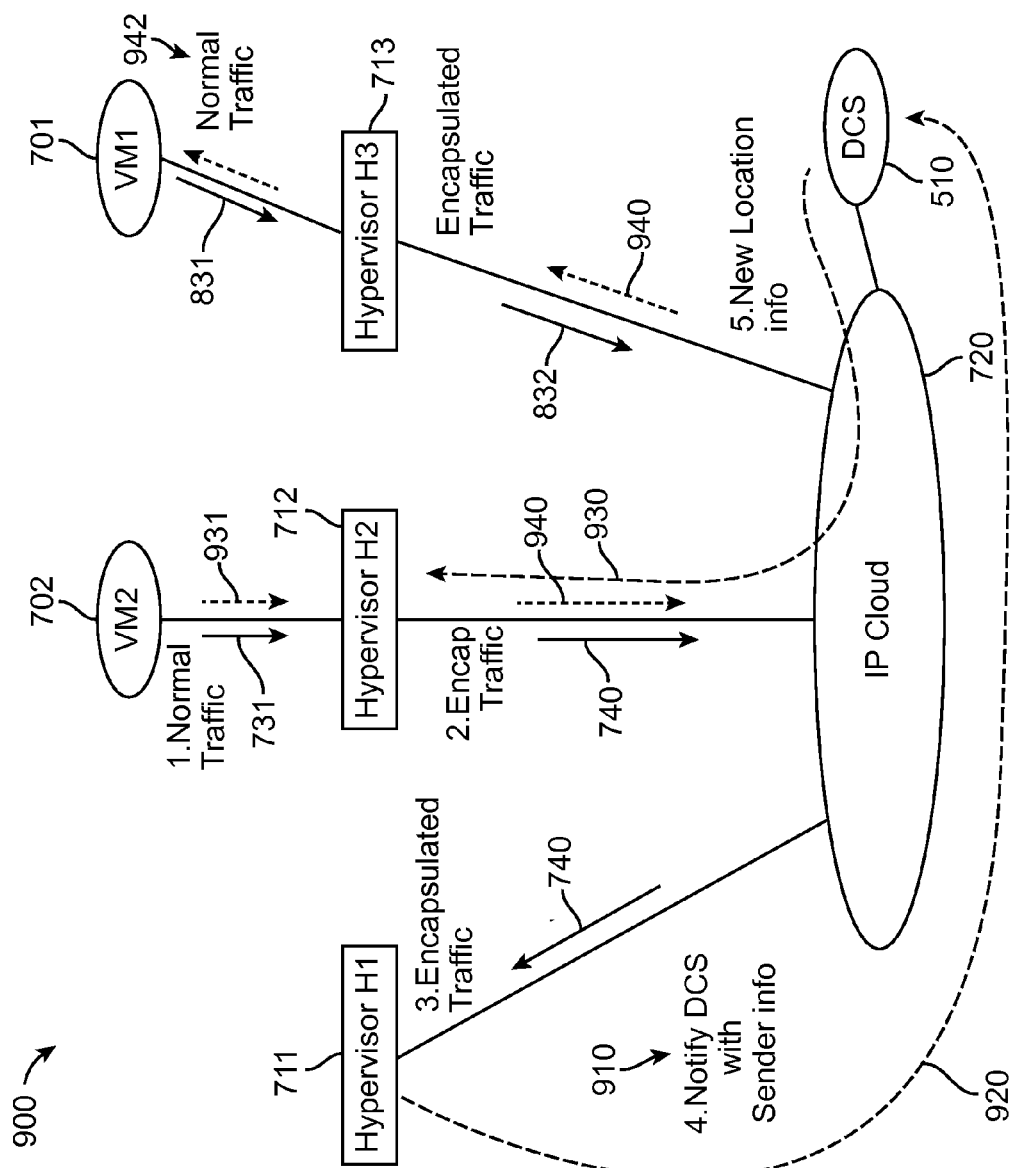
FIG. 9 is a block diagram showing an example overlay virtual network environment with traffic migration acceleration, in accordance with an embodiment of the invention.

FIG. 9 is a block diagram showing an example overlay virtual network environment 900 with traffic migration acceleration, in accordance with an embodiment of the invention. In one embodiment, loss of traffic sent from VM2 702 to VM1 701 may be reduced or avoided based on a process that provides for hypervisor H1 711 to notify the DCS server 510 regarding incoming encapsulated traffic 740 destined for a VM (e.g., VM1 701) that it does not host due to migration. In one embodiment, the information conveyed to the DCS server 510 comprises the source Hypervisor vSwitch information that is derived from the incoming encapsulated packet and target of the communication, such as the IP address and/or MAC address information of VM1 701.

In one embodiment, the DCS server 510 may notify hypervisor H2 712 regarding the new location information of VM1 701 (on hypervisor H3 713), and the hypervisor H2 712 may update its cache with the location information for VM1 701. The path of the location forwarding from the hypervisor H1 711, to the DCS server 510 is indicated by the dashed line 920, and the path of the location information to the hypervisor H2 712 from the DCS server 510 is indicated by the dashed line 930. In one embodiment, traffic 931 from VM2 702 is then encapsulated (encapsulated traffic 940) and transmitted to H3 713 for normal traffic 942 delivery to the VM1 701.

In one example embodiment, the process for traffic migration acceleration comprises the VM2 702 sending normal traffic 731 to its vSwitch. The hypervisor H2 712 communicates with its forwarding table and encapsulates traffic 740, sending the encapsulated traffic 740 to the IP cloud 720 and to the hypervisor H1 711. In one embodiment, the hypervisor H1 711 detects that the target (VM1's MAC/IP info) is not present in its forwarding tables (i.e., incorrect information). In one embodiment, the hypervisor H1 711 indicates to the DCS 510 that the hypervisor H2 712 has incorrect location information for VM1 701. In one embodiment, the DCS 510 sends a location information update to the hypervisor H2 712 to indicate that the VM1 701 is now hosted on the hypervisor H3 713. The hypervisor H2 712 then encapsulates the normal traffic 931 from the VM2 702 destined to VM1 701 and forwards the encapsulated traffic 940 to the IP cloud 720 and on to the hypervisor H3 713.

Normal traffic 942 flow from the VM2 702 to the VM1 701 is then restored. In one embodiment, the traffic from the VM1 701 to the VM2 702 may not be interrupted at all, since at all times the location of VM2 702 has not changed. In one embodiment, the DCS server 510 may automatically send the location information update for the VM1 701 to the hypervisor H2 712 without receiving notification from the hypervisor H1 711.

Figure 10:
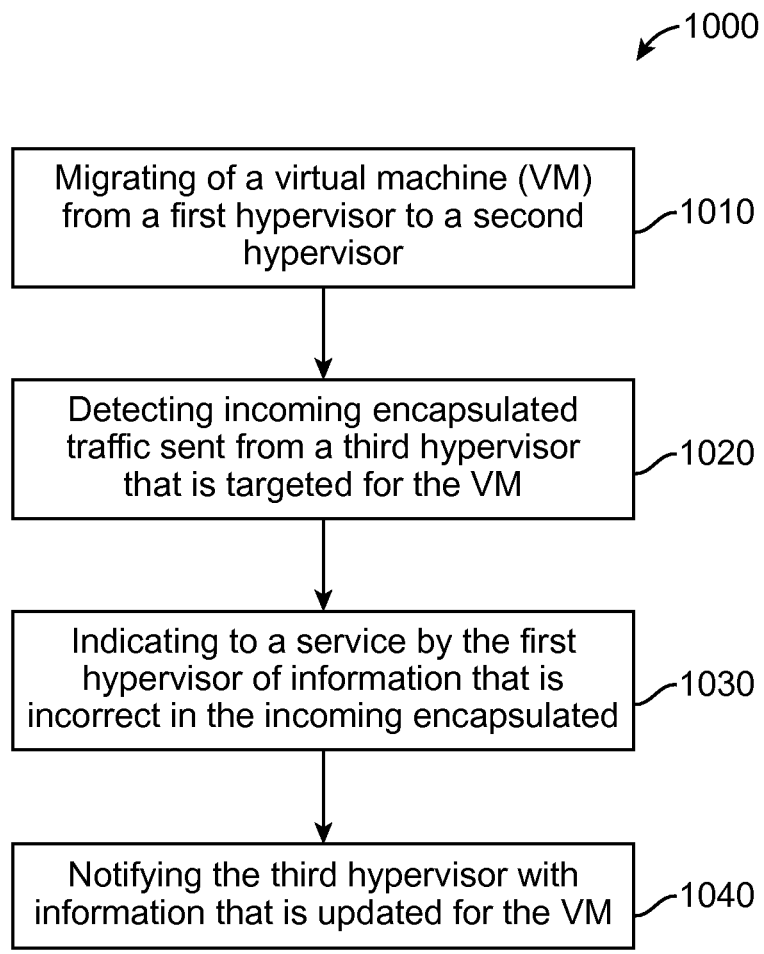
FIG. 10 is a block diagram showing an example process for traffic migration acceleration for migrated VMs in an example overlay network, in accordance with an embodiment of the invention.

FIG. 10 is a block diagram showing an example process 1000 for traffic migration acceleration for migrated VMs (e.g., VM1 701, FIG. 9) in an example overlay network (e.g., overlay network 900), in accordance with an embodiment of the invention. In one embodiment, process block 1010 provides migrating of a VM from a first hypervisor (e.g., hypervisor H1 711, FIG. 9) to a second hypervisor (e.g., hypervisor H3 713). In one embodiment, in block 1020, the first hypervisor detects incoming encapsulated traffic sent from a third hypervisor (e.g., hypervisor H2 712) that is targeted for the VM that migrated. In one embodiment, in block 1030 the first hypervisor indicates to a service (e.g., DCS server 510) of information that is incorrect in the incoming encapsulated traffic for the VM that migrated. In one embodiment, in block 1040 the third hypervisor is notified with information that is updated for the VM. In one embodiment, the information comprises location information, such as an IP address, a MAC address, etc.

In one embodiment, the first hypervisor notifies the DCS with the updated information for the migrated VM, and the DCS sends the updated location information to the third hypervisor. In one embodiment, the third hypervisor updates its memory (e.g., cache) with the updated location information for the migrated VM, encapsulates new traffic targeted for the migrated VM, and transmits the encapsulated new traffic to the second hypervisor for the targeted VM that migrated.

In one embodiment, the first hypervisor notifies the DCS with updated location information for the VM, and the DCS sends the updated location information to a DCS server. The DCS server sends the updated location information to the third hypervisor. In one embodiment, the third hypervisor updates its memory (e.g., cache) with the updated location information for the migrated VM, encapsulates new traffic targeted for the migrated VM, and transmits the encapsulated new traffic to the second hypervisor for the targeted VM that migrated.

The system 900 may include one or more source programs, executable programs (object code), scripts, or any other entity comprising a set of computer program instructions to be performed. When the system 900 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the system 900 is implemented in hardware, the system 900 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
   detecting, by a first hypervisor, incoming encapsulated traffic sent from a second hypervisor that is targeted for a virtual machine (VM) that has been migrated from the first hypervisor to a third hypervisor;
   detecting, by the first hypervisor, that target information is not present in the first hypervisor; and
   indicating, by the first hypervisor, to a service that the target information is incorrect in the incoming encapsulated traffic for the VM for causing notification of correct target information that is updated for the VM, the indication including first hypervisor virtual switch (vSwitch) information that is derived from an incoming encapsulated traffic and the correct target information, wherein the first hypervisor notifies the service with the updated target information for the VM causing the service to send the updated target information to the second hypervisor prior to a request from the second hypervisor to the service to forward the updated target information.

2. The method of claim 1, wherein the service comprises distributed overlay virtual Ethernet (DOVE) connectivity service (DCS), and the target information comprises at least one of an Internet Protocol (IP) address and a media access control (MAC) address.

3. The method of claim 1, further comprising:
   updating a memory of the second hypervisor with the updated target information;
   encapsulating new traffic targeted for the VM; and
   transmitting the encapsulated new traffic to the third hypervisor.

4. The method of claim 1, wherein the DCS sends updated target information to a server including a distributed overlay virtual Ethernet (DOVE) switch.

5. The method of claim 1, wherein the first hypervisor causes the DCS to send the updated target information to the second hypervisor.

6. The method of claim 5, further comprising:
   updating a memory of the second hypervisor with the updated target information;
   encapsulating new traffic targeted for the VM; and
   transmitting the encapsulated new traffic to the third hypervisor.

7. A system comprising:
   a hardware layer comprising physical devices;
   a plurality of virtual switches each associated a hypervisor and one or more virtual machines (VMs) overlaying the hardware layer; and
   a server including a distributed overlay virtual Ethernet (DOVE) connectivity service (DCS) that tracks VM information, wherein a first hypervisor is configured to detect incoming encapsulated traffic including target information for a targeted VM that migrated from the first hypervisor to a third hypervisor, to detect that the target information is not present in the first hypervisor, to initiate an indication to a DCS node that the target information is incorrect to cause a second hypervisor to receive notification with updated target information for the VM that migrated, the indication including first hypervisor virtual switch (vSwitch) information that is derived from the incoming encapsulated traffic and the updated target information,
   wherein the first hypervisor notifies the DCS with updated target information for the targeted VM to cause the second hypervisor to receive the updated target information prior to a request from the second hypervisor to the DCS to forward the updated target information.

8. The system of claim 7, wherein the target information comprises at least one of an Internet Protocol (IP) address and a media access control (MAC) address.

9. The system of claim 8, wherein the DCS sends the updated target information to the server.

10. The system of claim 9, wherein the server sends the updated target information to the second hypervisor based on the first hypervisor initiated indication.

11. The system of claim 10, wherein the second hypervisor updates a memory with the updated target information, encapsulates new traffic for the targeted VM, and transmits the encapsulated new traffic to the third hypervisor.

12. The system of claim 7, wherein the second hypervisor updates a memory with the updated target information, encapsulates new traffic for the targeted VM, and transmits the encapsulated new traffic to the third hypervisor.

13. A computer program product for providing acceleration for traffic migration of virtual machine (VM) migration in overlay networks, the computer program product comprising a computer readable storage medium having program code embodied therewith, the program code executable by a processor to perform a method comprising:
    detecting, by the first hypervisor, incoming encapsulated traffic sent from a second hypervisor that is targeted for a virtual machine (VM) that has been migrated from the first hypervisor to a third hypervisor;
    detecting, by the first hypervisor, that target information is not present in the first hypervisor; and
    indicating, by the first hypervisor, to a service that the target information is incorrect in the incoming encapsulated traffic for the VM for causing notification of correct target information that is updated for the VM, the indication including first hypervisor virtual switch (vSwitch) information that is derived from the incoming encapsulated traffic and the correct target information,
wherein the first hypervisor notifies the service with the updated target information for the VM causing the service to send the updated target information to the second hypervisor prior to a request from the second hypervisor to the service to forward the updated target information.

14. The computer program product of claim 13, wherein the service comprises a distributed overlay virtual Ethernet (DOVE) connectivity service (DCS), and the target information comprises at least one of an Internet Protocol (IP) address and a media access control (MAC) address.

15. The computer program product of claim 14, further comprising:
    updating, by the second hypervisor, a memory with the updated target information;
    encapsulating new traffic targeted for the VM; and
    transmitting, by the second hypervisor, the encapsulated new traffic to the third hypervisor.

16. The computer program product of claim 14, wherein the DCS sends updated target information to a server including a DOVE switch, and the DCS sends the updated target information to the second hypervisor.

17. The computer program product of claim 16,
    updating, by the second hypervisor, a memory with the updated target information;
    encapsulating new traffic targeted for the VM; and
    transmitting, by the second hypervisor, the encapsulated new traffic to the third hypervisor.

* * * * *